Sept. 27, 1927.
H. R. EAST
1,643,706
VEHICLE STEERING WHEEL ATTACHMENT
Filed Feb. 1, 1922
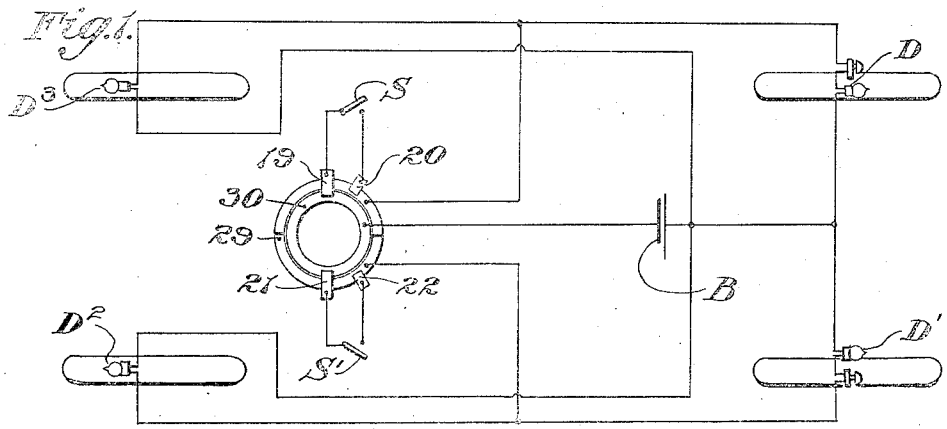
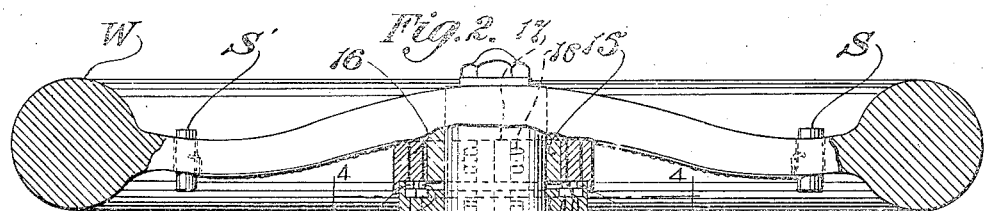
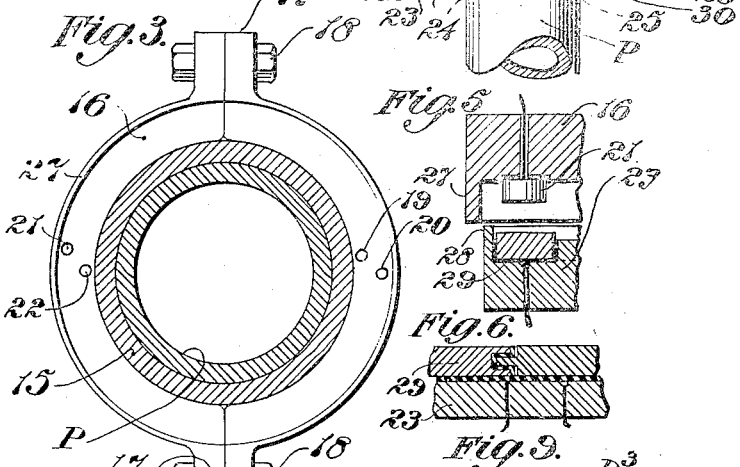
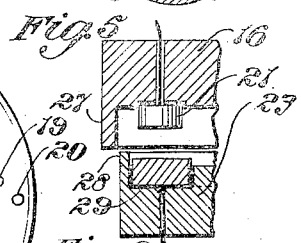
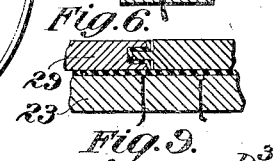
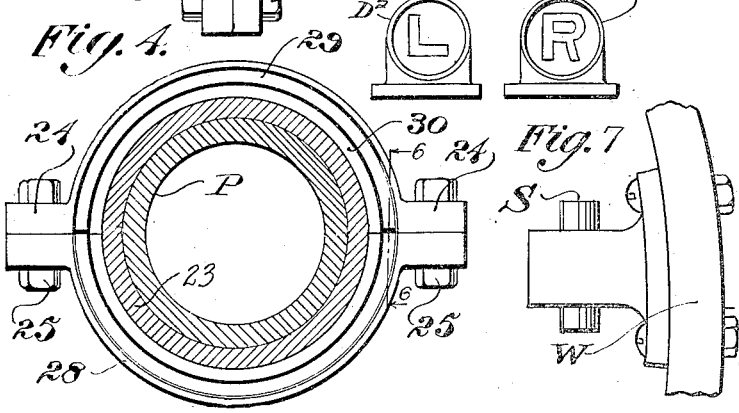
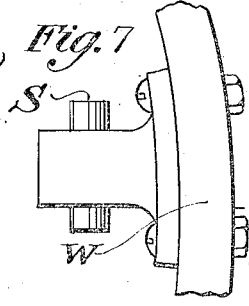
Inventor:
H. R. East.
by Hazard & Miller
Attys.

Patented Sept. 27, 1927.

1,643,706

UNITED STATES PATENT OFFICE.

HARRY R. EAST, OF LOS ANGELES, CALIFORNIA.

VEHICLE STEERING-WHEEL ATTACHMENT.

Application filed February 1, 1922. Serial No. 533,333.

My invention relates to direction indicators for motor vehicles, and a purpose of my invention is the provision of a direction indicator which can be readily actuated by the operator or driver of a vehicle without removing his hands from the steering wheel, the invention being of simple, durable and efficient construction and easily applied to an automobile of standard construction.

I will describe one form of direction indicator embodying my invention and will then point out the novel features thereof in claim.

In the accompanying drawings,

Figure 1 is a view showing diagrammatically one form of direction indicator embodying my invention.

Figure 2 is an enlarged sectional view of a steering wheel having a portion of the indicator shown in Figure 1 applied thereto.

Fig. 3 is a horizontal section through the steering post illustrating the upper collar in bottom plan.

Fig. 4 is a horizontal section taken substantially on the line 4—4 of Fig. 2.

Fig. 5 is a sectional view illustrating a portion of Fig. 2 upon an enlarged scale.

Fig. 6 is a sectional view taken upon the line 6—6 of Fig. 4.

Figure 7 is a fragmentary detail view of a steering wheel showing another application of one of the switches comprised in the indicator shown in Figure 1.

Similar reference characters refer to similar parts in each of the several views.

Referring specifically to the drawings and particularly to Figure 2, my invention is here illustrated as applied to a steering wheel of conventional form and designated at W, and the steering wheel includes a hub portion 15 embraced by a collar 16 which, as clearly shown in Figure 3, is formed of two semi-circular sections having the terminals thereof provided with radially extended flanges 17 formed with openings for the reception of bolts 18. This arrangement provides means for fixedly securing the collar 16 to the hub 15 so that rotation of the steering wheel effects rotation of the collar. The collar 16 is provided with contact plugs 19 to 22 inclusive, arranged in pairs at diametrically opposite points on the lower side of the collar, with the plugs of each pair disaligned circumferentially for a purpose which may become evident hereinafter.

As shown in Figures 2 and 4, a second collar 23 is fixed to the steering post P, and this collar is formed of semi-circular sections having terminal flanges 24 through which bolts 25 extend. As clearly shown in Figure 5, the confronting sides of the collars 16 and 23 are formed with peripherally disposed annular flanges 27 and 28, respectively, which, in the assembled position of the collars occupy overlapping relation so as to properly seal the space between the collars against the elements. The lower collar 23 is provided upon its upper side with two contact rings, designated at 29 and 30, and these rings as shown in Fig. 4 are arranged concentric of each other. Each ring is formed of semi-circular sections having interfitting ends, such as are shown in Fig. 6, and the sections of the ring 29 are insulated from each other and from the ring 30. The arrangement of the rings 29 and 30 is such that the inner contact plugs 19 and 22 contact at all times with the ring 30, while the contacts 20 and 21 at all times contact with the ring 29.

Conductors are extended from the contact plugs to manually operable switches S and S', which, as shown in Figure 2, are sustained upon the spokes of the steering wheel and in convenient position to be readily operated by the hands while in gripping position with respect to the rim of the steering wheel. The switches can be arranged on the rim of the steering wheel as shown in Figure 7.

The direction indicator includes rear signals D and D' and forward signals D² and D³. The drawing illustrates both of the rear signals D and D' as being provided with audible alarms. The particular construction of the signals is immaterial, although the drawing illustrates lamps adapted to be illuminated. In the operation of the indicator, current is supplied to all of the lamps, signals, the parking light, and the bells from a source of current such as the battery B. By reference to Fig. 1 it will be seen that when it is desired to illuminate the signals D' and D² for indicating that the vehicle is about to turn to the left, the switch S' is closed, so that current from the battery B flows through the rings 29 and 30, the switch S', the lamps of the signals D' and D², and back to the battery. In a similar manner on closing the switch S, the signals D and D³ will be actuated to indicate that the vehicle is about to turn to the right.

By virtue of the fact that the plugs 19, 20, 21 and 22 are in constant contact with the rings 29 and 30, irrespective of the position of the steering wheel, the proper illumination of the signals can take place at any time.

Although I have herein shown and described only one form of direction indicator embodying my invention, it is to be understood that various changes and modifications may be made herein without departing from the spirit of the invention and the spirit and scope of the appended claim.

What I claim is:

A device of the class described comprising a collar formed of two sections adapted to be positioned about the hub of a steering wheel, means for securing said sections together, a second collar formed of two sections adapted to be positioned about a steering wheel post, means for securing the sections of the second collar together, two contact rings mounted on the second collar, both of said rings being formed of semi-circular sections with the sections of one ring being insulated from each other, two pairs of contactors carried by the first collar, one contact of each pair being in sliding contact with one ring and the other contactors being in sliding contact with their respective insulated sections of the other ring, and switches connected to each pair of contactors.

In testimony whereof I have signed my name to this specification.

HARRY R. EAST.